United States Patent [19]

Breyer et al.

[11] Patent Number: 5,471,406
[45] Date of Patent: Nov. 28, 1995

[54] METHOD OF MEASURING ELEMENTAL SHAPES OF A WORKPIECE ON A COORDINATE MEASURING MACHINE

[75] Inventors: Karl-Hermann Breyer, Heidenheim; Berndt Kammleiter, Oberkochen; Otto Ruck, Pfahlheim, all of Germany

[73] Assignee: Carl Zeiss-Stiftung, Oberkochen, Germany

[21] Appl. No.: 35,716

[22] Filed: Mar. 23, 1993

[30] Foreign Application Priority Data

Apr. 14, 1992 [DE] Germany ............ 42 12 455.7

[51] Int. Cl.⁶ ............ G05B 19/19; G05B 19/4093
[52] U.S. Cl. ............ 364/559; 364/560; 364/474.29; 364/474.37; 364/191; 33/503; 33/504; 33/505
[58] Field of Search ............ 364/560, 562, 364/474.17, 474.05, 474.29, 474.37, 559, 191; 33/503, 504, 505, 559

[56] References Cited

U.S. PATENT DOCUMENTS

| 4,283,669 | 8/1981 | Jacoby | 318/578 |
|---|---|---|---|
| 4,621,434 | 11/1986 | Hirschmann | 33/503 |
| 4,769,763 | 9/1988 | Trieb et al. | 364/559 |
| 5,257,204 | 10/1993 | Sawada et al. | 364/474.37 X |
| 5,276,974 | 1/1994 | Chanoni et al. | 33/503 |
| 5,309,364 | 5/1994 | Aramaki et al. | 364/474.37 X |

FOREIGN PATENT DOCUMENTS

| 0211202 | 2/1987 | European Pat. Off. . |
|---|---|---|
| 2921166 | 11/1980 | Germany . |
| 3210711 | 2/1984 | Germany . |
| 02145908 | 6/1990 | Japan . |
| 2049995A | 6/1980 | United Kingdom . |
| 2069142 | 8/1981 | United Kingdom . |
| WO9007097 | 6/1990 | WIPO . |

OTHER PUBLICATIONS

Technisches Messen, Bd. 54, Nr. 7–8, 1987, Munchen, De Seiten 277–284 (This reference is not accompanied by an English translation.).

*Primary Examiner*—Ellis B. Ramirez
*Assistant Examiner*—Eric W. Stamber

[57] ABSTRACT

For rapid measurement of workpieces having elemental shapes of known geometry in any orientation in space, the elemental shapes are scanned on a coordinate measuring machine which is equipped with a measuring probe head having a permissible measurement range (MR). The computer of the measuring machine is programmed with basic data for establishing a predetermined path of probe-scanning contact with the workpiece, the predetermined path being so calculated (1) that the probe ball of the probe will remain in continuous contact with the workpiece surface, (2) that probe-head measurements always occur within the permissible measurement range (MR) of the probe head, and (3) that probe-ball displacements reflect probe-head measurements that are taken as measured corrections of the predetermined path. The control system of the coordinate measuring machine monitors the permissible measurement range (MR) of the probe head and corrects for such bending of the probe pin as may occur in the course of scanning along the predetermined path.

16 Claims, 6 Drawing Sheets

METHOD OF MEASURING ELEMENTAL SHAPES OF A WORKPIECE ON A COORDINATE MEASURING MACHINE

BACKGROUND OF THE INVENTION

The present invention relates to a method of measuring elemental workpiece shapes of any desired spatial orientation on a coordinate measuring machine having a measuring probe head. The expression "elemental shapes" as used herein is to be understood as comprehending inter alia such elemental workpiece features as bores, corners, spherical or flat surfaces, etc.

More particularly, the invention relates to a so-called "scanning" method in which the probe pin of a probe head remains in continuous contact with the workpiece surface in the course of scanning displacement. Such scanning methods make it possible rapidly to record a large number of measurement points which describe the shape of the workpiece. For this purpose, a so-called measuring probe head is required, i.e., a probe head which has measured-value transmitters which provide signals that are proportional to the magnitude of probe deflection in the respective coordinate directions.

Scanning methods which use measuring probe heads are in themselves already known and are described, for example, in German Patent 2,921,166 and in U.S. Pat. No. 4,769,763.

In the known method and coordinate-measuring machine of German Patent 2,921,166, and after the probe has contacted the workpiece, the probe head is moved or guided at constant speed along and in the axial direction of a first coordinate, the so-called primary coordinate. At the same time, the probe is kept in continuous contact with the workpiece by a readjustment procedure pursuant to a signal from a measured-value transmitter in the probe head, wherein said signal corresponds to instantaneous deflection of the probe in a second direction which is perpendicular to the primary-coordinate axis. As soon as the speed of readjustment displacement becomes greater than the controlled advance in the primary coordinate, the two axes are interchanged. In this way, the probe head automatically follows contours on the workpiece, and these contours need not have been previously known.

The method described in U.S. Pat. No. 4,769,763 also permits automatic scanning of unknown workpiece contours, by predetermining the absolute value of the scanning speed and the desired probe deflection, and by using measured deflection of the probe in a process of continuous recalculation of the direction of scanning displacement tangential to the surface of the workpiece.

It is characteristic of both known methods that the measured-value transmitters of the probe head are combined in a control circuit and that the direction of advance is continuously readjusted in accordance with these signals. For this reason, both methods are relatively slow.

From International Patent Application WO 90/07097, a scanning method is known by which a large number of measurement points on two-dimensional workpiece geometries are to be recorded rapidly. For this purpose, the probe pin of the coordinate measuring machine is mounted to a so-called "measuring rotate-swing joint" or "articulating head", which affords selective rotary positioning of the probe pin about each of two orthogonally related axes. The coordinate measuring machine controls articulation of this joint or head with constant speed over a path of simple geometry, for example, a straight line or a circle, at the same time, the probe pin is applied substantially perpendicular to the direction of travel, with constant force against the workpiece, and is driven in a spiral oscillating movement. Only very few formed features of given predetermined geometry can be measured with this method. Furthermore, it is not possible to scan workpiece features in any desired spatial orientation, since the articulating joint already requires a certain preorientation of the elemental shapes.

BRIEF STATEMENT OF THE INVENTION

The object of the present invention is to provide a method for the continuous measuring of elemental workpiece shapes of any three-dimensional orientation, while permitting the recording of a large number of measurement points in the shortest possible measurement time.

The invention achieves this object, using a coordinate measuring machine having a measuring-probe head, a programmable computer and a control system connected for computer-operated control of the control system. The measuring head (i) is computer-controlled for displacement in each of three machine-coordinate directions (X, Y, Z), (ii) has measurement systems which indicate the amount of probe deflection ($\vec{A}_{act}$) in the coordinate directions (X', Y', Z'), and (iii) has measurement-force generators for adjusting the measurement force ($\vec{F}$) which the probe exerts on the workpiece in the individual coordinate directions (X', Y', Z'). Pursuant to method steps of the invention:

(a) the computer transmits to the control system data Pi (X, Y, Z) which describe a desired location and a desired contour of the workpiece feature to be measured;

(b) the control system derives, from the data of step (a), path data (Li) for movement of the probe head in such manner, with respect to the desired contour, (i) that the tip of a probe-head mounted probe remains in continuous contact with the workpiece and (ii) that probe deflection ($\vec{A}_{act}$) remains within a permissible measurement range (MR) of the probe head;

(c) the control system so adjusts the forces of the individual measurement-force generators that the resultant total measurement force ($\vec{F}_{des}$) applied by the probe at each of a desired plurality of spaced measurement points is directed toward the workpiece surface; and (d) deviations of the actual contour from the desired contour are calculated within the control system.

The invention is based on the discovery that it is possible to measure elemental shapes, such as, for example, cylinder bores, locating surfaces, etc., on workpieces considerably faster than heretofore, if their geometrical shape and their position are at least roughly known. In large part, the measurement tasks in coordinate measurement consist in checking dimensional precision within predetermined tolerances, and therefore the desired values for the position and geometry (contour) of elemental shapes and features to be measured are generally known. Accordingly, a substantial number of the measurement tasks arising in practice can be carried out with the invention considerably faster than was previously the case.

Due to the high measurement speed that is obtainable, the invention can also be used in cases in which heretofore only single-point measurements were effected. The new method results in definitely better reproducibility of measurement results, due to the very much greater density of points per-unit measurement time, since "freak points" are without importance, and any dependence on "randomly" selected contact points is eliminated. Due also to the high density of points, the new method provides improved results in measurements of shape, such as roundness, cylindrical shape, planarity, linearity, as well as localization measurements such as, for instance, position and symmetry of the shaped elements. Matching calculations (envelope and Pferch-element evaluation) can thus be carried out by the computer of the coordinate measuring machine; these calculations provide functionally correct measurement results, as for example, in the evaluation of "rough-surface" machine parts, such as castings and forgings.

It is essential, for purposes of the method of the invention, that the path of probe-head displacement, with respect to which the probe-pin ball is to be controlled in accordance with desired values, shall agree with the actual geometry of the workpiece feature, or that no great differences exist, such agreement being within the measurement-range capacity (e.g., 2-mm) of the probe head per se. It is therefore advisable, as a preliminary step, to verify the desired position of the formed feature to be measured, before scanning over its contour, by contacting a few points of the contour and, if necessary, adapting the path data in accordance with the result of the verification. This preliminary step can be dispensed with if, during travel over the contour of the workpiece, the position of the probe within the measurement range of the probe head is monitored and if continuous migration of the probe in the direction toward the edge of the measurement range is compensated, as by building into the path data for probe-head displacement a correctional quantity which corresponds to a constant offset in the opposite direction.

In order to preclude error due to bending of the probe pin as a result of different measuring forces during the measurement process, it is advisable either to maintain the amount of the resultant measurement force constant throughout the measurement process or to determine it at each of the locations at which measurement points are recorded. In the latter case, it is possible to calculate, from the amount and direction of the total measurement force, correction values which describe the bending of the probe with respect to measurement force and direction, and these correction values can also be included in the calculation of the actual contour of the elemental shape.

Since considerably faster measurement is effected with the method of the invention and, accordingly, the moving parts of the machine are also moved very much faster, inertial errors may possibly occur as a result of dynamic acceleration forces acting on the entire frame of the machine. It is therefore advantageous to include these acceleration forces and the bending behavior of the movable parts of the coordinate measuring machine, the same having been previously determined, for example, experimentally, or calculated on the basis of models in the calculation of the actual contour of the shaped element.

The method of the invention can be carried out with a probe head which contains active measurement-force generators via which the measurement force which the probe exerts on the workpiece can be adjusted for the coordinate directions. The method of the invention can also be carried out with a measuring probe head which contains "passive" springs, which produce a measurement force proportional to the deflection of the probe in the respective coordinate directions. The measurement force exerted on the workpiece can, in the latter case, be calculated on the basis of the amount and direction of the deflection of the probe or probe pin, and can be included in the determination of the bending of the probe.

DETAILED DESCRIPTION

Different embodiments of the invention will be described in detail, in conjunction with the accompanying drawings, in which.

Figure 1:
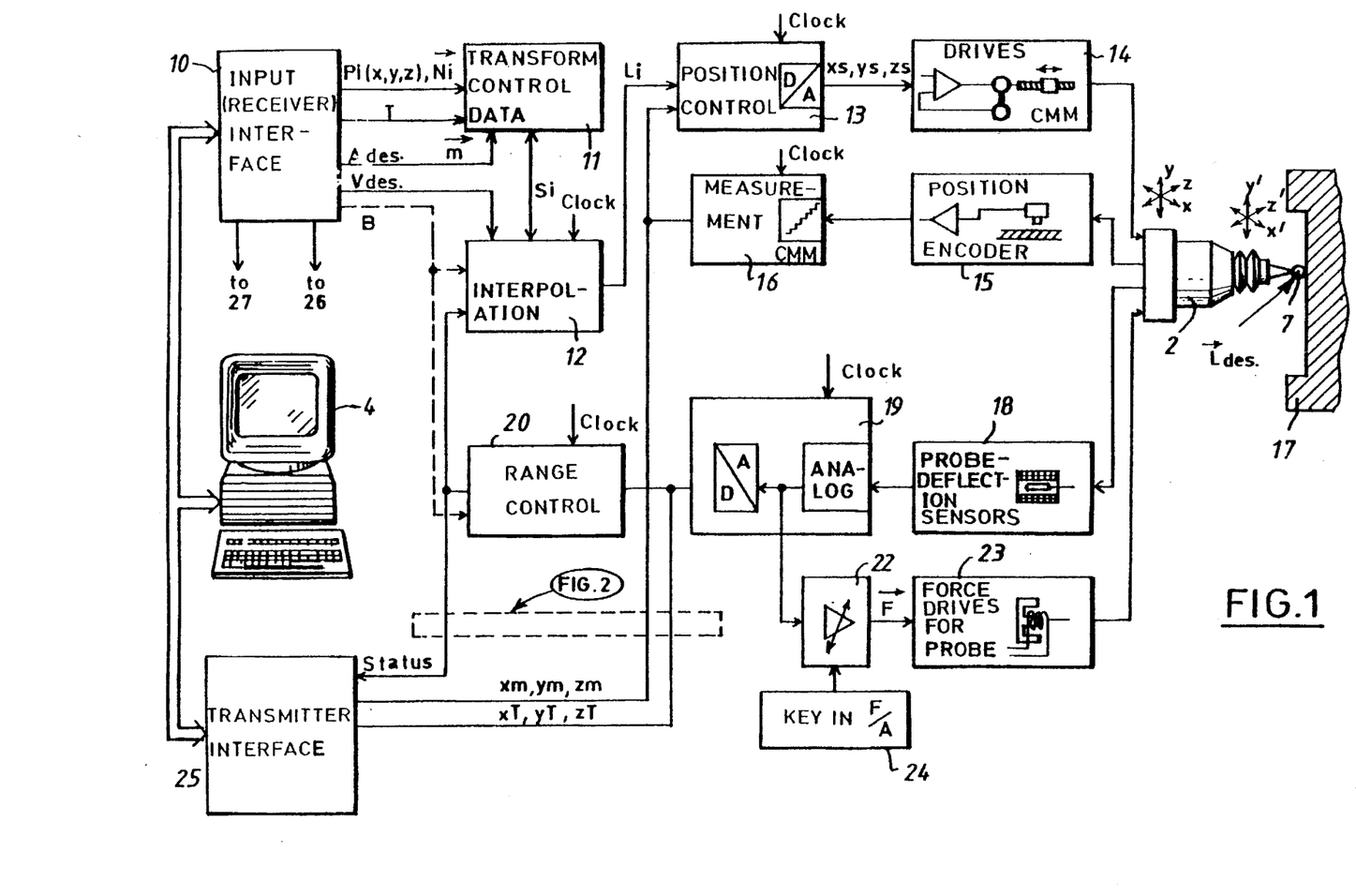
FIG. 1 is a block diagram which shows essential components, including function modules, for control of a coordinate-measuring machine which operates in accordance with a first of several variants of the method of the invention.

In FIG. 1, the control system of a coordinate-measuring machine is seen to comprise essential components based on a receiver or input interface 10 and a transmitter interface 25 each of which is connected to the programmable evaluation computer 4 of a coordinate-measuring machine, not shown in full detail. The following data are transferred by the computer 4 via the input interface 10 to the control system:

a) The transformation matrix T which describes the location of the workpiece-coordinate system (WCS) in the machine-coordinate system (MCS) of the coordinate measuring machine (CMM);

b) The vector $\vec{m}$ which describes the location of the center point of the probe ball used in the machine-coordinate system with respect to a reference point on the probe head 2 of the coordinate measuring machine;

c) The predetermined speed of advance ($\vec{V}_{des}$) with which the workpiece is to be scanned;

d) Information as to the desired mode of operation (O), insofar as several different modes of operation are possible;

e) The value of the so-called "insertion depth" in terms of magnitude and direction, i.e., the desired value of probe deflection ($\vec{A}_{des}$) which is to apply for the course of measurement travel on the surface of the workpiece.

In addition, the input interface 10 transmits the data necessary to describe the desired contour to be followed by the probe ball. Such data are, for example, a series of points Pi (X, Y, Z), as well as the normal vectors Ni associated with the individual points Pi (X, Y, Z) on the surface of the workpiece 17 to be measured.

The most important factor in the control system of FIG. 1 is the provision of one or more microprocessors. Accordingly, some of the functions suggested by labels in FIG. 1 are not realized by hardware but are part of the firmware of these one or more microprocessors. This is true, for example, of the function unit 11, designated "TRANSFORM CONTROL DATA", meaning "Desired Value Preparation, Transformation", which is connected to the input interface 10. The function unit 11 calculates path data (Si) according to which the probe ball is to move and is moved with respect to the workpiece 17; this calculation is made from control data, such as the desired position ($\vec{L}_{des}$) of the probe ball for the scanning process, the desired "insertion depth" ($\vec{A}_{des}$), and points Pi (X, Y, Z) along the desired contour. These path data (Si) are transmitted, with coordinate transformation (pursuant to matrix T) into the control system, i.e., the machine-coordinate system (MCS).

The function unit 11 ("TRANSFORM CONTROL DATA") supplies path data to another function unit 12, designated "INTERPOLATION", meaning "Support-Point Generator/Interpolation". In this function unit 12, the prepared calculated discrete path points (Si) to be traversed are interpolated in the control's own system cycle in accordance with a predetermined algorithm, for example, linearly, or in accordance with a spline algorithm, and are transferred as desired location values (Li) to a position controller 13 for the drives 14 of the three measurement axes (X, Y, Z) of the coordinate measuring machine.

The support-point generator at 12 furthermore receives directly from input interface 10 the desired speed of advance ($\vec{V}_{des}$) with which the workpiece is to be traversed and measured. The desired location values produced in the position controller 13 are then converted to analog values and transmitted as analog setting variables ($X_s$, $Y_s$, $Z_s$) to the three drives for the X, Y, and Z axes of the coordinate measuring machine. To simplify the showing, the three drives have been schematically shown, combined in one drive subassembly 14 in FIG. 1. Each of the three drives of the coordinate measuring machine will be understood, as is customary, to comprise a servoamplifier, a servomotor, and mechanical drive members by means of which the probe head 2 is moved relative to the workpiece 17.

The path-measurement systems of the coordinate measuring machine, designated at 15, associated with the three measurement axes (X, Y, Z), are connected to the position controller 13 via another function unit 16, designated "MEASUREMENT", signifying "Measured Value Detection". The measurement systems of the coordinate measuring machine may consist, as is customary, of measurement scales, each of which has a grid division, a scanning head for reading of the scale, and associated electronic circuitry for signal preparation, interpolation, and forward/return counting of signals supplied by the scanning heads. Unit 16 provides cyclic detection of the coordinate positions ($X_m$, $Y_m$, $Z_m$) of the probe head in the machine-coordinate system, and position-control circuitry for the three measurement axes of the coordinate measuring machine is completed via a coupling to the position controller 13.

The position-measured values ($X_m$, $Y_m$, $Z_m$) supplied by the function unit 16 are also applied to the output or transmitter interface 25 of the control system and are reported back to computer 4.

The control system of FIG. 1 will also be understood to contain electronic means for further processing of the signals produced by measured-value transmitters (sensors) in the probe head 2, which signals describe the deflection of the probe pin upon contact of its probe ball 7 with the workpiece 17, in three coordinate directions in space, the same being designated "PROBE-DEFLECTION SENSORS", at 18. Analog position signals from these measured-value sensors are converted into digital values in another function unit 19, from which digital output values ($V_T$, $Y_T$, $Z_T$) are applied to the transmitter interface 25, for use by computer 4 in calculating the result of the measurement. At the same time, digital signals concerning probe deflection are fed to a function unit 20, labelled "RANGE CONTROL", meaning "Monitoring and Error Handling", as will be explained. The function unit 20 compares the actual probe deflection ($X_T$, $Y_T$, $Z_T$) with the preselected insertion depth ($\vec{A}_{des}$) and, when probe deflection leaves the permissible range (MR), sends a reporting signal to the evaluation computer 4, and at the same time, the range-control unit 20 reports to the support-point generator at 12 that the permissible measuring range has been exceeded, so that unit 12 can interrupt the scanning process and stop the machine drives.

The control system of FIG. 1 further contains individual drives for deflection of the probe pin in the probe head. These drives consist of force generators, such as, for example, linear motors or moving-coil magnets which can deflect the probe pin in the three directions X, Y and Z, as appropriate, upon occurrence of a predetermined signal. The corresponding function unit 23 "FORCE DRIVES FOR PROBE" receives its setting level of force ($\vec{F}$) from the function unit 22, which in FIG. 1 contains symbolism for "Force Regulator Means". With the described mode of operation, force-regulator means 22 establishes an opposing force which is proportional to the deflection of the probe pin. Since the force-path curve implemented in the force regulator means is a constant of the machine, the instantaneous measurement force exerted on the workpiece is also known via the output signal of unit 19 and can be used by the computer 4 to calculate correction values to compensate for such probe-pin bending as results from the selected setting of measurement force.

The latter function can, however, also be integrated in the control system itself. In such case, the block diagram of the control system is to be supplemented by components shown in FIG. 2, and at the location defined in FIG. 1, by a rectangle of dashed lines, keyed by legend to FIG. 2. The parameters (bi) which describe the bending behavior of the selected probe-pin configuration are then transferred from the input interface 10 to a function unit 26, designated "Bend Correction".

Figure 2:
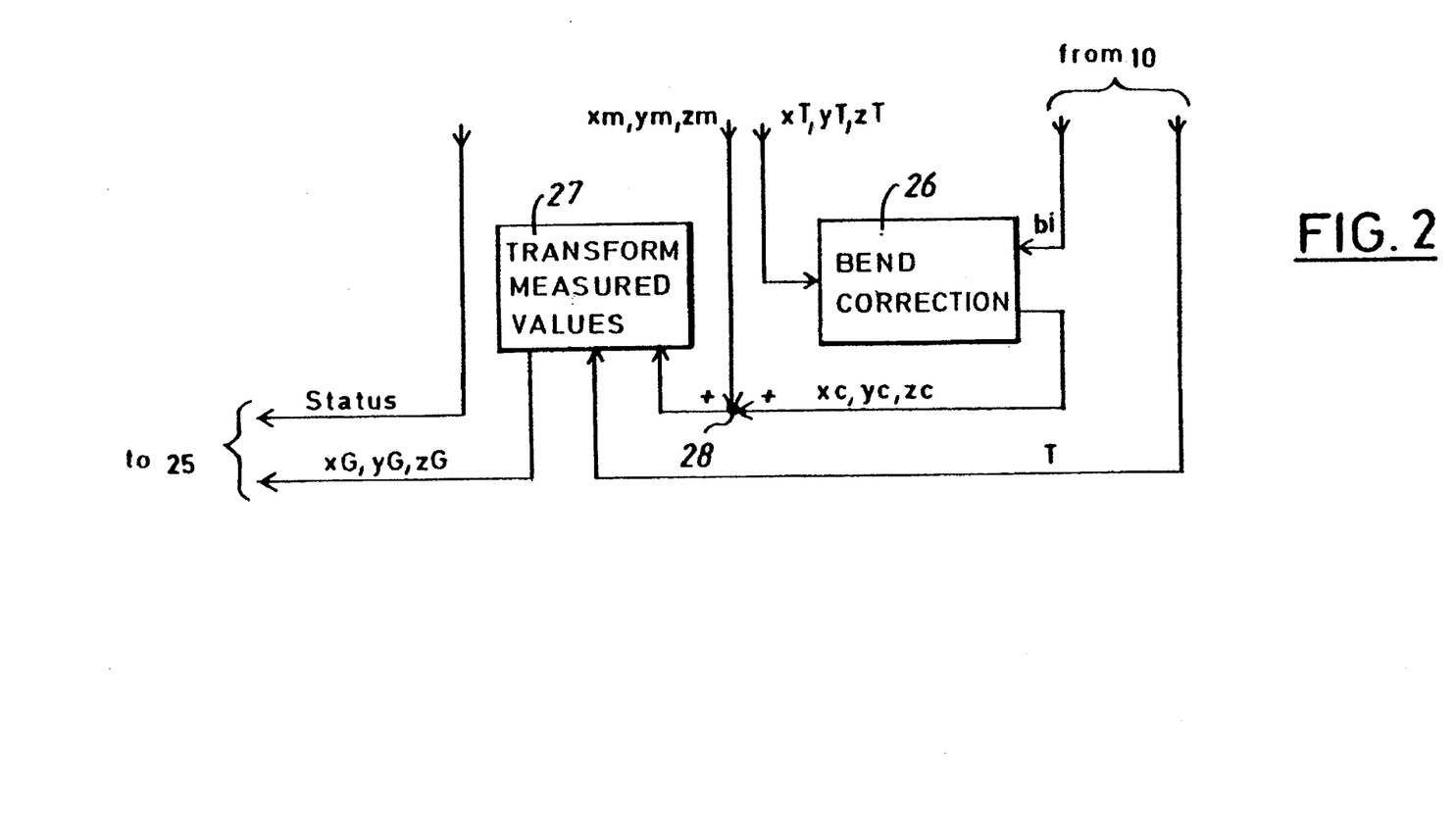
FIG. 2 is a block diagram of an additional function module for control in accordance with FIG. 1.

In the variant shown in FIG. 2, the data of bend-corrected probe-pin deflection $X_c$, $Y_c$, $Z_c$ are not transferred separately to interface 25 (as in FIG. 1) but, rather are added (at 28) to the actual position values $X_m$, $Y_m$, $Z_m$ of the probe head, available from unit 16, which it will be recalled is where measurement-head position is measured on the CMM. After addition of the probe-bend correction data to the actual position values, positions of the center of the probe ball are available in the machine coordinate system. Therefore, in this FIG. 2 variant, the control system contains a further function unit 27, "TRANSFORM MEASUREMENT VALUES", via which the actual data are transformed by the machine-coordinate system (MCS) into the workpiece-coordinate system (WCS). The center-point coordinates of the probe ball are then transmitted from the function unit 27 to the transmitter interface 25. The interface 25 will be understood to store and contain measured values determined by the control system, thus buffering the detected data until they are called for by the evaluation computer 4, for further computer processing. Illustratively, 250 measured values per second can be stored at 25.

Figure 3:
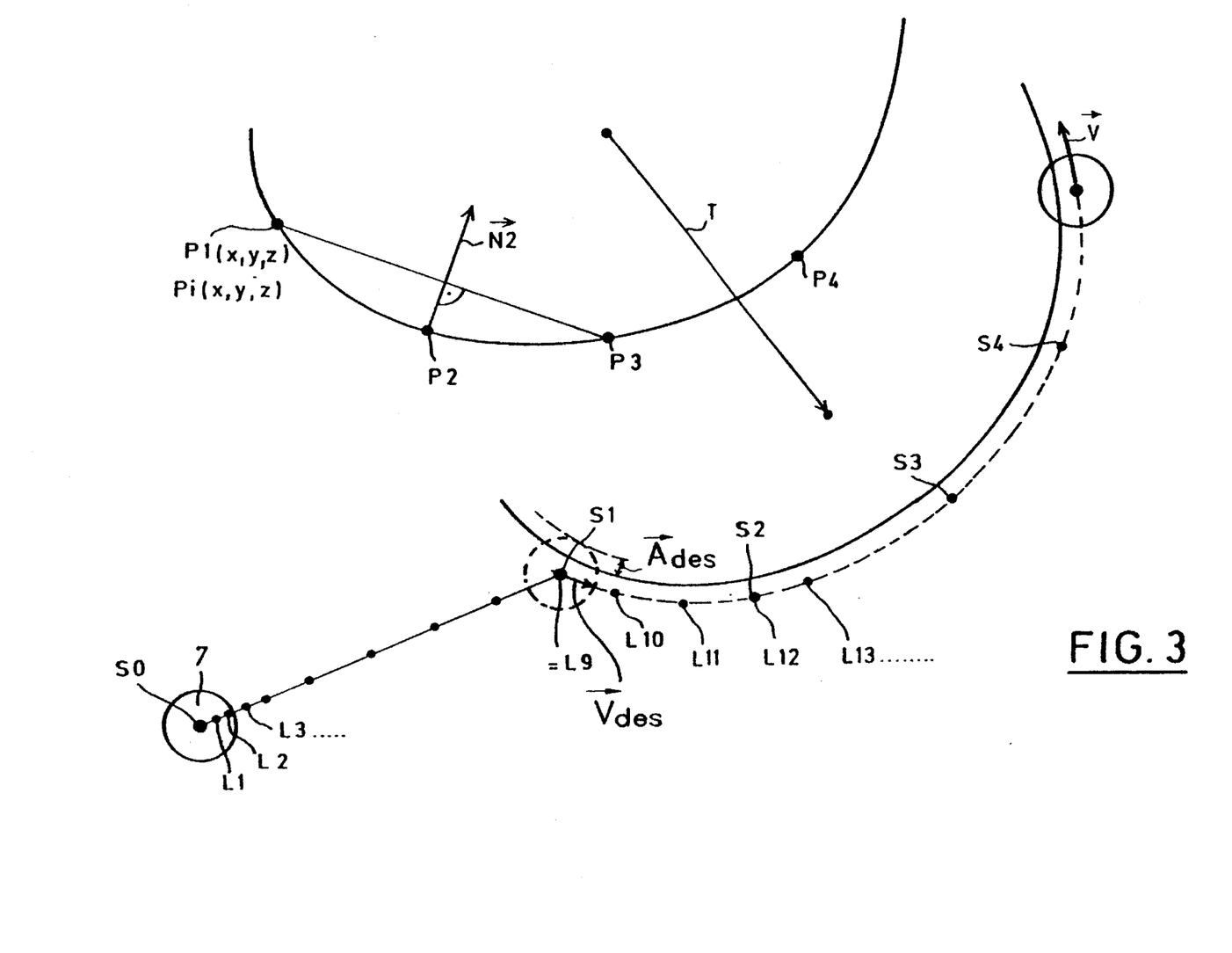
FIG. 3 is a simplified diagrammatic showing of the course of the path for the probe ball of a probe head, scanning in accordance with the method of the invention along the surface of a workpiece.

The manner of operation of the described control system of FIGS. 1 and 2 will now be explained, with reference to the diagrammatic showing of FIG. 3.

After the data described in connection with input interface 20 has been transferred by the computer 4 to the control system, several initial, preparatory calculations are performed by the function unit 11. For example, unit 11 first checks whether the predetermined insertion depth, i.e., the desired value ($A_{des}$) of probe deflection can be kept within the permissible range (MR) for probe deflection; this check is made by parallel shifting of the desired curve (contour path) in the direction toward the predetermined direction of immersion (probe-pin deflection). In the case of workpiece contours of shallow curvature this is possible. In such case, the points Pi (X, Y, Z) of the desired contour (namely, points $P_1$, $P_2$, $P_3$, $P_4$) are transformed by the workpiece coordinate system (WCS) into the machine-coordinate system (MCS), and are then transferred to the support-point generator 12.

If the insertion depth cannot be kept within the permissible range (MR) by parallel shifting of the path, then an equidistant path must be produced. For this purpose, either a normal vector ($\vec{Ni}$) is required for each point of the surface of the workpiece, these normal vectors being also received by function unit 11 via the input interface 10 from computer 4; or else, it is possible so to program the function unit 11 that unit 11 itself calculates, in each case from three adjacent points Pi (X, Y, Z), a vector which forms the bisector of the angle defined by and between lines joining the three adjacent points and places this bisector in the plane of the triangle defined by the three adjacent points. The first direction vector ($\vec{N2}$) can be calculated if three successive points ($P_1$, $P_2$, $P_3$) are known. Furthermore, the first support point (S1) in the machine coordinate system can be calculated with the aid of the desired value ($A_{des}$) for the insertion depth. These mathematical and logical operations are carried out by the function unit 11 "TRANSFORM CONTROL DATA" for all transmitted points Pi (X, Y, Z), and the path data (Si) thus obtained are transmitted to the support point generator at 12.

In the type of operation described above, the force-control circuitry of the probe head 2 is linked to the function units 18, 19, 22 and 23. The support-point generator at 12 now starts to calculate support points (Li) by interpolating from the instantaneous actual position (So) of the probe head (somewhere above the workpiece 17) up to the first desired position (S1) of the path to be traversed on the workpiece 17. This is effected in accordance with the following three rules:

a) the connection of the two points So, S1, and therefore from the actual position to the first desired position, is established by a straight line;

b) the sequence of the support points $L_1$–$L_9$ is so selected that a support point is at hand for each clock-controlled cycle of the machine;

c) the distance between the points (Li) increases continuously, in accordance with an "acceleration function" which is determined by the control system.

Thereupon, the support-point generator at 12 forwards the support points as desired-position values (Li) to the position controller 13 which, together with the drives 14, the measurement systems 15 of the measurement axes of the coordinate measuring machine, and the measurement-function unit 16, forms the position-control circuit of the coordinate measuring machine. In this way, the probe ball 7 is moved to the point (S1) on the workpiece 17 from which the scanning and measurement process is started. Also, in this connection, the probe ball 7 of the deflectable probe pin of the probe head contacts the workpiece 17 in such controlled manner that the extent of probe deflection corresponds to the preselected "insertion depth" ($A_{des}$).

During the ensuing measurement process proper, the probe ball 7 is displaced along the precalculated path on the surface of the workpiece, while in continuous contact with the surface of the workpiece. The position of the probe ball 7 (which is determined from the position of the probe head 2), and the deflection of the probe pin to which the probe ball 7 is fixed, are detected continuously by the measurement systems 15 and 18 and are transmitted via interface 25 to the computer 4 of the coordinate measuring machine. From these values, the computer then calculates the actually tracked contour of the elemental shape or other characteristic workpiece feature, such as the position of a center point, or the extent of a diameter, etc. in the case of a bored-hole feature.

Figure 7:
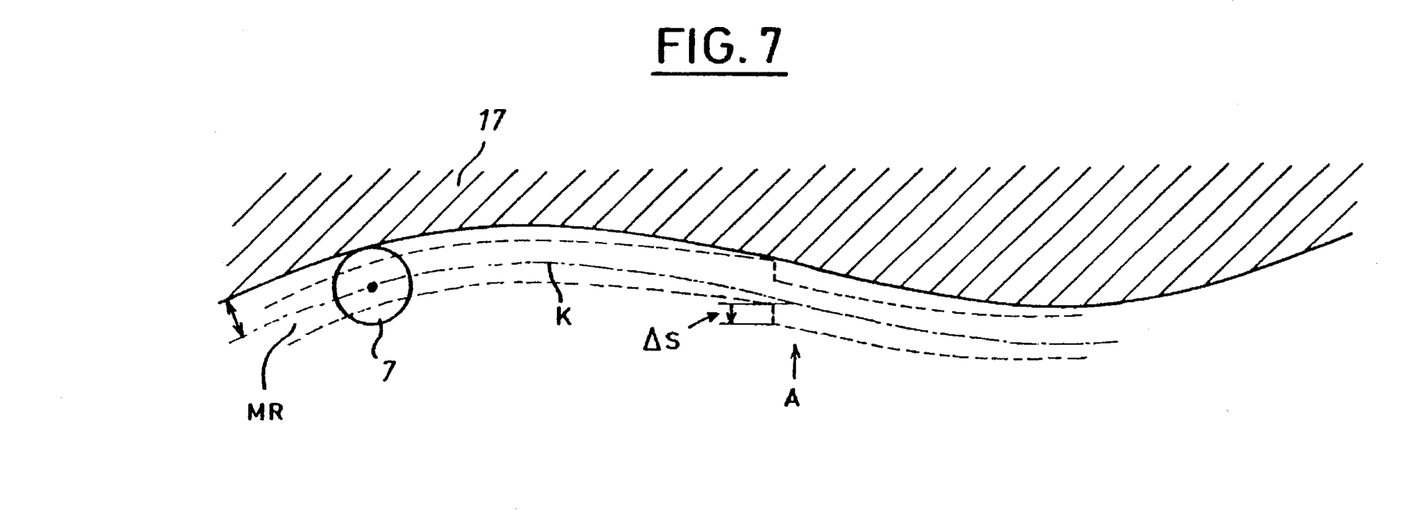
FIG. 7 is a simplified diagrammatic showing of the course of the path for the probe ball of a probe head which is scanning in accordance with the method of the invention along the surface of a workpiece, with greater deviations between the desired geometry and the actual geometry of the workpiece.

In the course of scanning the surface of the workpiece over relatively large regions, the situation may arise that, due to deviations between the desired geometry and the actual geometry of the workpiece, probe deflection ($\vec{A_{act}}$) could reach and exceed predetermined maximum limits (MR) of probe deflection. Such a case is illustrated in FIG. 7, where the probe ball 7 is shown engaged to and resting against the surface of the workpiece, and where the desired path determined for probe-ball displacement is represented by the region (MR) extending between dashed lines, it being understood that this region (MR) at the same time indicates the predetermined limits of permissible probe-pin deflection. The displacement path (K) for the center point of the probe ball 7 extends initially within the predetermined limits of probe deflection, but due to the particular local geometry of the workpiece 17, the actually tracked workpiece contour approaches one of the limits of the region (MR) of maximum permissible probe deflection and in fact reaches this permissible limit at the place designated by an arrow A. This situation is recognized by the function unit 20 (FIG. 1). In the limiting situation at A in FIG. 7, the function unit 20 of FIG. 1 develops and sends an error-report signal to interface 25 and to function unit 12, which thereupon stops the coordinate-measuring machine.

Figure 4:
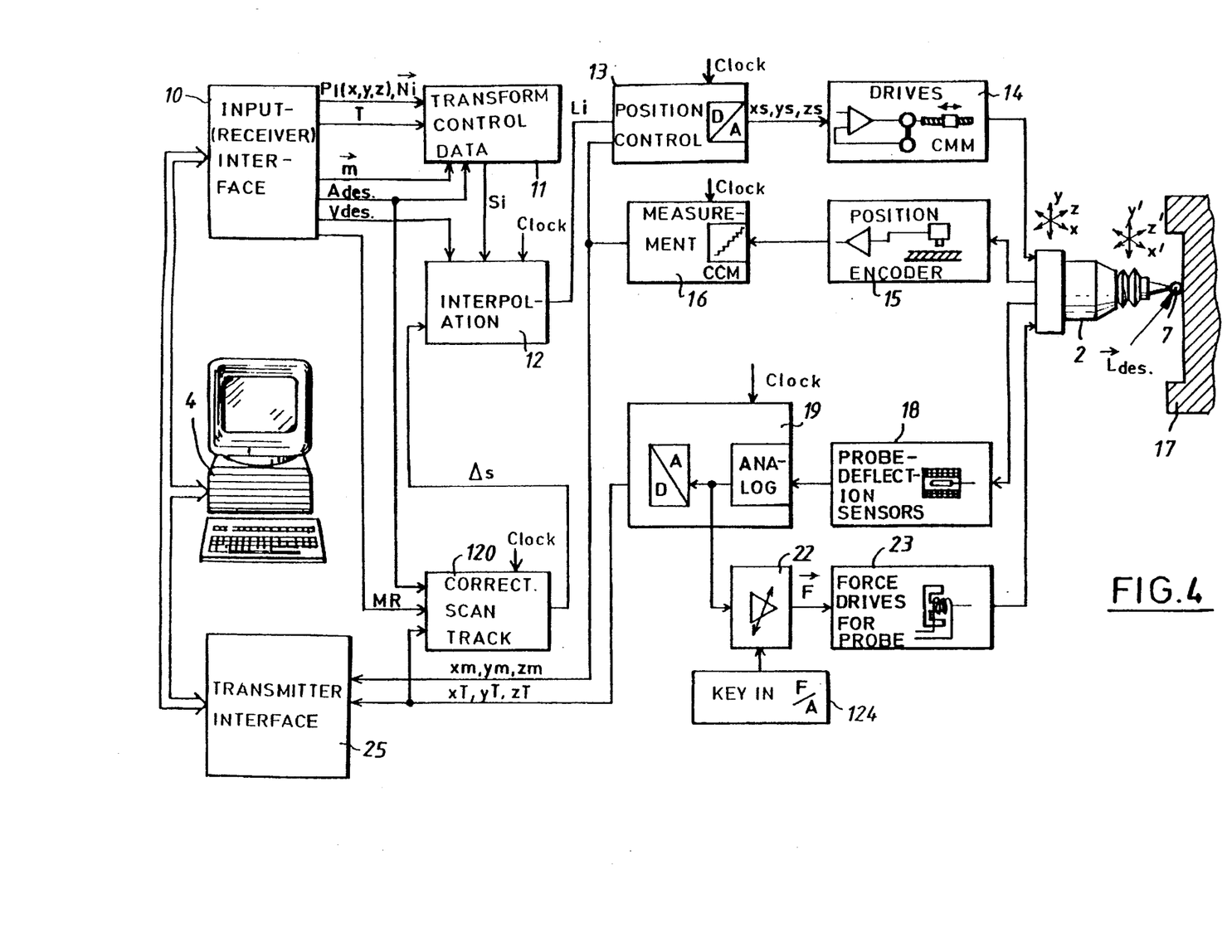
FIG. 4 is a block diagram which shows essential components for control of a coordinate-measuring machine which operates in accordance with a second variant method of the invention.

In the modified embodiment of FIG. 4, on the other hand, and in substitution for the function unit 20, a function unit 120 is provided by which control of the desired path is automatically corrected. In this connection, the function unit 120 causes the support-point generator at 12 to displace or offset the calculated desired path of probe ball guidance, to a predetermined constant extent ΔS away from the surface of the workpiece, by application of an offsetting digital quantity. Probe deflection is then again within the permissible range, and the scanning process is continued.

Except for the force controller 22 of FIG. 4, the other function units in the embodiment of FIG. 4 remain the same as described for the embodiment of FIG. 1; these other subassemblies therefore need not be further explained.

The force controller 22 of FIG. 4 will be understood to contain for each of the three component directions of probe drive, a closed control loop by which a predetermined proportionality is established between the force ($\vec{F}$) set by the drive means 23 and the actual probe deflection ($\vec{A_{act}}$). The force v. displacement characteristic curves are so adjusted for all three directions in space that spherical mathematical shells or loci of equal force exist around the zero position of the probe. In this way, with known probe deflection ($\vec{A_{act}}$), it is possible by means of the spring constant F/A (=machine constant) resulting from the characteristic curve also directly to compute the forces ($\vec{F}_{act}$) to be used for probe-bend correction. The symmetry of the characteristic curves in the three axes can be checked by scanning a roundness standard, for instance a gauge ring, in the manner of a circular-shape test. The inputting of the machine constant F/A is effected, for example, by means of a programmable digital-analog converter 124.

In the described variants of measurement-force connection, less than half of the measurement range of the probe head 2 is available in all cases for probe deflections during travel over the predetermined desired contour, since the probe pin cannot be deflected forward on the workpiece. The latter, indeed, is the case in connection with the embodiment yet to be described in connection with FIG. 5.

At this point, it should be mentioned that it is also possible, instead of active drives 23 in the probe head 2, to use passive springs or to operate a probe head of corresponding construction in combination with the described control system. In such case, the desired measurement force ($\vec{F}$) is automatically established as a result of the actual probe-pin deflection ($\vec{A}_{act}$), and the force controller 22 can also be dispensed with.

Figure 5:
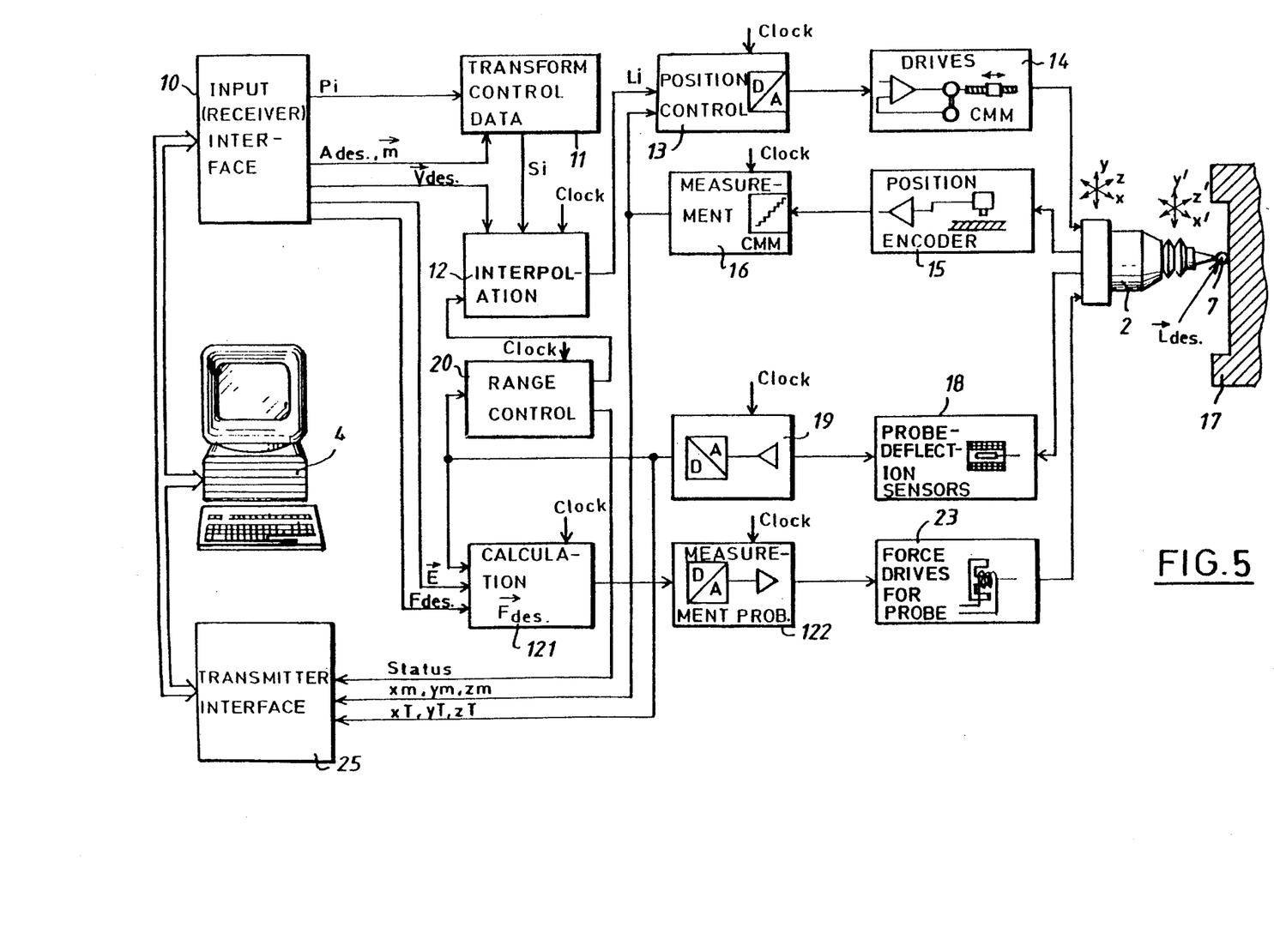
FIG. 5 is a block diagram which shows essential components for control of a coordinate-measuring instrument which operates in accordance with a third variant method of the invention.

The embodiment of FIG. 5 represents a slight modification as compared with the control system of FIG. 1. In FIG. 5, it is assumed that the geometry of the workpiece can be described by series of points (Pi) and section planes (E). This being the case, it is possible to describe the measurement direction, i.e., the direction in which the probe pin is deflected upon contact with the workpiece, by a vector ($V_E$) which lies in a given section plane and is directed perpendicular to the direction of advance on the surface of the workpiece. To this end, the embodiment of FIG. 5 has a function unit 121 for calculating the presented measuring-force vector ($\vec{F}_{des}$) from data received from the input interface 10, by which data the location of the measurement direction, i.e., of the section plane (E), is described. The function unit 121 is also connected to unit 19, from which it receives a digital report of the actual position of the probe deflection ($X_T$, $Y_T$, $Z_T$).

It will be recalled that in the illustrative embodiment of FIG. 1, measurement force ($\vec{F}$) is applied via the probe-pin drive means 23 of the probe head 2. On the other hand, in the embodiment of FIG. 5, a function 122 is provided via which the drives 23 in the probe head are controlled in accordance with a measurement-force vector ($\vec{F}_{des}$) that is calculated by a function unit 121, i.e., in accordance with the preselected value of measuring force ($\vec{F}_{des}$), the same having been received from input interface 10 in the direction calculated from the section plane (E).

To make certain that probe deflection ($\vec{A}_{act}$) remains in the section plane E, i.e., in the predetermined direction of measurement, the deflection of the probe pin is electronically and effectively clamped (by operation of unit 121) in directions other than those calculated for the desired-force vector ($\vec{F}_{des}$) by the function unit 121; in other words, for deflections in these directions, the drives 23 in the probe head 2 are acted on by high restoring forces. In this way, in the case of workpiece contours having a so-called "hanging position", i.e., where the section plane (E) of the measurement direction is not perpendicular to the surface of the workpiece, the desired path of the probe ball 7 on the surface of the workpiece can be well maintained, without need for impermissibly large forces, such as would be the case if the probe pin were mechanically clamped in particular directions X, Y, Z.

Since in the embodiment of FIG. 5, the measurement force ($\vec{F}$) remains constant over the entire range of deflection of the probe pin in the direction of measurement, and thus the permissible measurement range (MR) is fully utilized for the probe deflection, the probe head 2 can move with greater speeds of advance along the contour of the workpiece as compared with the embodiment shown in FIG. 1.

Figure 6:
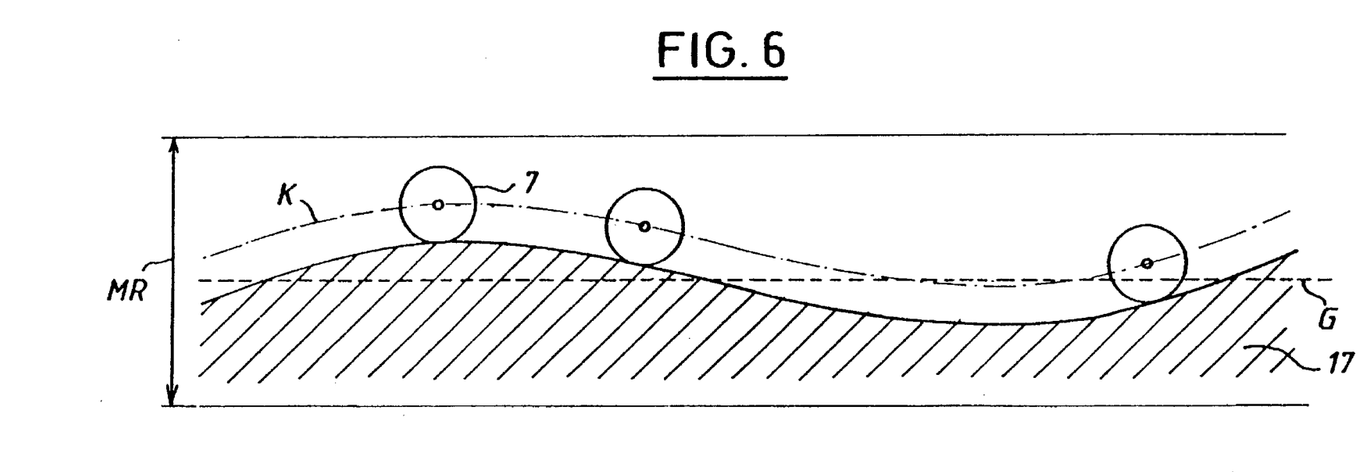
FIG. 6 is a simplified diagrammatic showing of the course of the path for the probe ball of a probe head which is scanning in accordance with the method of the invention along the surface of a workpiece in the case of surfaces of fine structure, i.e., with minor deviations between the desired geometry and the actual geometry of the workpiece.

It is thus also possible, as shown in FIG. 6, to travel over more detailed geometries of the surface of the workpiece without these detailed geometries themselves having to be pre-established as desired paths along which the probe head is moved in the three machine axes of the coordinate measuring machine. Rather, a more simple contour, for example a fixed straight line G, can be pre-established for the desired path K if the deviations of the actual geometry from this fixed line lie within the permissible working or measurement range (MR) for probe-pin deflection. Since the fine movements are then carried out exclusively by the probe pin, and its dynamic responses are ordinarily better than those of the movable masses of the coordinate measuring machines, substantially greater speeds of advance can then be realized.

What is claimed is:

1. A method of measuring an elemental shape or feature of a workpiece in any desired orientation in space, to determine deviations of an actual contour of the elemental shape from a desired contour of the elemental shape, using a computer-operated coordinate-measuring machine (CMM) having a control system for multiple-coordinate drives for positioning a measuring probe head (2) in machine-coordinate axes (X, Y, Z), wherein the measuring probe head (2);

has a deflectable probe with a probe ball for workpiece contact, has, within a permissible measurement range (MR), measurement means (18) producing signals which indicate probe deflection ($A_{act}$) in coordinate directions (X', Y', Z'), and contains measurement-force generators (23) by which measurement force (F) which the deflectable probe exerts on the workpiece (17) can be adjusted for the coordinate directions (X', Y', Z') or contains springs which produce in the coordinate directions a measurement force which is directionally proportional to probe deflection, said method being characterized by the following method steps:

(a) predetermined-path data Pi (X, Y, Z) which are 3-dimensional and which describe a desired location and a desired contour of the elemental shape to be measured are transmitted by the computer (4) of the coordinate measuring machine to the control system for control of the coordinate drives of the coordinate measuring machine;

(b) from the predetermined-path data of step (a), path data (Li) are derived along which the measuring probe head (2) is moved in such manner with respect to the desired contour that the probe ball (7) on the deflectable probe remains applied against the workpiece (17) and the probe deflection ($A_{act}$) remains within the permissible measurement range (MR) of the measuring probe head (2);

(c) forces of the measurement-force generators (23) or a predetermined probe deflection ($A_{des}$) corresponding to the desired contour are so adjusted that a resultant total measurement force ($F_{des}$) is applied at each measurement point along the desired contour; and (d) from the signals of the measurement means (18) of the measuring probe head, deviations of the actual contour of the elemental shape from the desired contour or characteristics such as location of center point, or magnitude of diameter, of the elemental shape are calculated.

2. A method according to claim 1, wherein the deflectable probe is bendable and has predetermined characteristics of bend deflection as a function of measurement force, and wherein for each measurement point, predetermined values of magnitude and direction of total measurement force ($F_{act}$) and probe deflection ($A_{act}$) are used in step (b) for calculating correction values which describe the bending of the deflectable probe, and that these correction values ($X_c$, $Y_c$, $Z_c$) are used in the calculation of the actual contour ($X_g$, $Y_g$, $Z_g$) of the elemental shape.

3. A method according to claim 1, characterized by the fact that means (121) are provided by which the deflectable probe can be electronically clamped in some but not all coordinate directions, whereby to limit probe deflection essentially only for preselectable coordinate directions.

4. A method according to claim 1, characterized by the fact that the resultant total measurement force ($F_{des}$) of step (c) is maintained constant.

5. A method according to claim 1, characterized by the fact that dynamic acceleration forces and bending behavior of of and within the coordinate-measuring machine are taken into account in the calculation of step (d).

6. A method according to claim 1, wherein the deflectable probe is bendable and has predetermined characteristics of bend deflection as a function of measurement force, and wherein for each measurement point, predetermined values of magnitude and direction of total measurement force ($F_{act}$) or probe deflection ($A_{act}$) are used in calculating correction values which describe the bending of the deflectable probe, and that these correction values ($X_c$, $Y_c$, $Z_c$) are used in calculating the actual contour ($X_g$, $Y_g$, $Z_g$) of the elemental shape.

7. The method of claim 1, wherein the coordinate measuring machine (CMM) has CMM position-measuring systems (15) in CMM measurement axes, and wherein measured values (16) from the CMM position-measuring systems (15) are used in conjunction with values measured by deflection of the deflectable probe of the measuring probe head in the step (d) calculation of deviations of the actual contour from the desired contour.

8. A method of measuring an elemental shape or feature of a workpiece in any desired orientation in space, to determine deviations of an actual contour of the elemental shape from a desired contour of the elemental shape, using a computer-operated coordinate-measuring machine (CMM) having a control system for multiple-coordinate drives for positioning a measuring probe head (2) in machine-coordinate axes (X, Y, Z), wherein the measuring probe head (2):

has a deflectable probe with a probe ball for workpiece contact, has, within a permissible measurement range (MR), measurement means (18) producing signals which indicate probe deflection ($A_{act}$) in coordinate directions (X', Y', Z'), and contains measurement-force generators (23) by which measurement force (F) which the deflectable probe exerts on the workpiece (17) can be adjusted for the coordinate directions (X', Y', Z') or contains springs which produce in the coordinate directions a measurement force which is directionally proportional to probe deflection, said method being characterized by the following method steps:

(a) predetermined-path data Pi (X, Y, Z) which are 3-dimensional and which describe a desired location and a desired contour of the elemental shape to be measured are transmitted by the computer (4) of the coordinate measuring machine to the control system for control of the coordinate drives of the coordinate measuring machine;

(b) verifying the desired location of the elemental shape to be measured, before measuring the desired contour, the verification being by individual measurements at a few spaced points along the desired contour to be subsequently measured for greater detail, the predetermined path data of step (a) being adapted to the verification measurements before making a detailed measurement of the desired contour along the predetermined path of step (a);

(c) from the predetermined-path data of step (a), path data (Li) are derived along which the measuring probe head (2) is moved in such manner with respect to the desired contour that the probe ball (7) on the deflectable probe remains applied against the workpiece (17) and the probe deflection ($A_{act}$) remains within the permissible measurement range (MR) of the measuring probe head (2);

(d) forces of the measurement-force generators (23) or a predetermined probe deflection ($A_{des}$) corresponding to the desired contour are so adjusted that a resultant total measurement force ($F_{des}$) is applied at each measurement point along the desired contour; and (e) from the signals of the measurement means (18) of the measuring probe head, deviations of the actual contour of the elemental shape from the desired contour or characteristics such as location of center point, or magnitude of diameter, of the elemental shape are calculated.

9. A method of measuring an elemental shape or feature of a workpiece in any desired orientation in space, to determine deviations of an actual contour of the elemental shape from a desired contour of the elemental shape, using a computer-operated coordinate-measuring machine (CMM) having multiple-coordinate drives for positioning a measuring probe head (2) in machine-coordinate axes (X, Y, Z), wherein the measuring probe head (2):

has a deflectable probe with a probe ball for workpiece contact, has, within a permissible measurement range (MR), measurement means (18) producing signals which indicate probe deflection ($A_{act}$) in coordinate directions (X', Y', Z'), and contains measurement-force generators (23) by which measurement force (F) which the deflectable probe exerts on the workpiece (17) can be adjusted for the coordinate directions (X', Y', Z') or contains springs which produce in the coordinate directions a measurement force which is directionally proportional to probe deflection, said method being characterized by the following method steps:

(a) predetermined-path data Pi (X, Y, Z) which are 3-dimensional and which describe a desired location and a desired contour of the elemental shape to be measured are entered into the computer (4) of the coordinate measuring machine for control of the coordinate drives of the coordinate measuring machine;

(b) from the predetermined-path data of step (a), path data (Li) are derived along which the measuring probe head (2) is moved in such manner with respect to the desired contour that the probe ball (7) on the deflectable probe remains applied against the workpiece (17) and the probe deflection ($A_{act}$) remains within the permissible measurement range (MR) of the measuring probe head (2);

(c) during step (b) measurement of measuring probe-head movement, monitoring deflection of the deflectable probe within the permissible measurement range (MR) of the measuring-probe head (2), and compensating for migration of the deflectable probe in a direction toward a limit of the permissible measurement range (MR), the compensation being by making an indexing correction of path data, said indexing correction comprising an indexing quantity which corresponds to a constant offset ΔS away from said limit of the permissible measurement range;

(d) forces of the measurement-force generators (23) or a predetermined probe deflection ($A_{des}$) corresponding to the desired contour are so adjusted that a resultant total measurement force ($F_{des}$) is applied at each measurement point along the desired contour; and (e) from the signals of the measurement means (18) of the measuring probe head, deviations of the actual contour of the elemental shape from the desired contour or characteristics such as location of center point, or magnitude of diameter, of the elemental shape are calculated.

10. A control-system kit for a programmable computer-operated coordinate measuring machine (CMM) having a measuring probe head with probe-pin deflection-measuring transmitters, said kit containing the following functional units:

position controller means (13) for CMM drives for displacing the measuring-probe head in CMM measurement axes (X, Y, Z);

measured-value detection means (19) adapted to respond to signals from deflection-measuring transmitters (18) in the measuring-probe head;

a function unit (11) which from data Pi (X, Y, Z) which are 3-dimensional and are delivered by the computer (4), from which a desired shape of a workpiece (17) to be measured is described, calculates a predetermined path (Si) for displacement of the measuring probe head (2), said predetermined path being offset with respect to the desired shape of the workpiece; and an interpolator (12) which is adapted to calculate, from the predetermined path (Si), desired-position values (Li) for the position controller means (13).

11. A control-system kit according to claim 10, in which the kit additionally contains:

a function unit adapted to calculate probe-pin displacement, from a predetermined measurement force ($F_{act}$) or from deflection of the probe pin ($A_{act}$) proportional thereto.

12. A control-system kit according to claim 10, in which the measuring probe head has a deflectable probe and the kit additionally contains:

monitoring means by which actual values ($A_{act}$) of probe deflection in the measuring probe head are monitored, said monitoring means being adapted to produce a corresponding signal when predetermined limit values (MR) are exceeded or approached.

13. A control-system kit according to claim 10, in which the kit additionally contains:

a force regulator (20) for adjusting measurement force exerted on a workpiece (17) by force generators in the measuring probe head (2) of the coordinate measuring machine.

14. The method of using a coordinate measuring machine to measure an elemental shape or feature of a workpiece, wherein the coordinate measuring machine (CMM) has a measuring-probe head (2), a programmable computer and a control system connected for programmed operation of the control system, which measuring-probe head:

has a deflectable probe with a probe tip for workpiece contact;

is computer-controlled for displacement in each of three machine-coordinate directions (X, Y, Z);

has measurement systems (18) which indicate probe deflection ($A_{act}$) in CMM coordinate directions (X', Y', Z'); and contains measurement-force generators (23) for adjusting a measurement force (F) which the deflectable probe exerts on the workpiece in the CMM coordinate directions (X', Y', Z'); said method comprising the following method steps:

(a) using the computer to transmit to the control system data Pi (X, Y, Z) which are 3-dimensional and which describe a desired location and a desired contour of the workpiece feature to be measured;

(b) using the control system to derive, from the data of step (a), path data (Li), for movement of the measuring-probe head (2) in such manner, with respect to the desired contour (i) that the probe tip remains in continuous contact with the workpiece and (ii) that probe deflection ($A_{act}$) remains within a predetermined permissible measurement range (MR) of the measuring probe head (2);

(c) using the control system to so adjust the measurement-force generators (23) that a resultant total measurement force ($F_{des}$) is applied by the deflectable probe at each of a desired plurality of spaced measurement points and is directed toward a feature of the workpiece; and (d) using the control system to calculate deviations of a measured actual contour as departures from the desired contour.

15. The method of claim 14, in which step (d) further includes use of the calculated deviations to calculate such other workpiece features as a center point, or a diameter.

16. A coordinate-measuring machine (CMM) having a measuring-probe head (2), a programmable computer (4) and a control system connected for programmed operation of the control system, said machine being computer-controlled for displacement in each of three CMM measurement directions (X, Y, Z), said measuring-probe head (2) having a deflectable probe for workpiece contact, said measuring-probe head having measurement systems (18) which indicate probe deflection ($A_{act}$) in coordinate directions (X', Y', Z') of the measuring probe head, and said measuring-probe head having adjustable force generators (23) adapted to exert controlled measuring force (F) of the deflectable probe in contact with a workpiece, such that a net selected force (F) derives from component forces in individual coordinate directions (X', Y', Z'); said control system comprising the following functional units:

measured-value detection means (16) adapted to respond to signals from CMM position-measurement systems (15) in CMM measurement axes;

a function unit (11) which from data Pi (X, Y, Z) which are 3-dimensional and are delivered by the computer (4), from which a desired shape of a workpiece (17) to be measured is described, calculates a predetermined path (Si) to be scanned by the measuring probe head (2), said predetermined path being offset with respect to the desired shape of the workpiece; and an interpolator (12) which is adapted to calculate, from the predetermined path (Si), desired-position values (Li) for the control system.

* * * * *